UNITED STATES PATENT OFFICE.

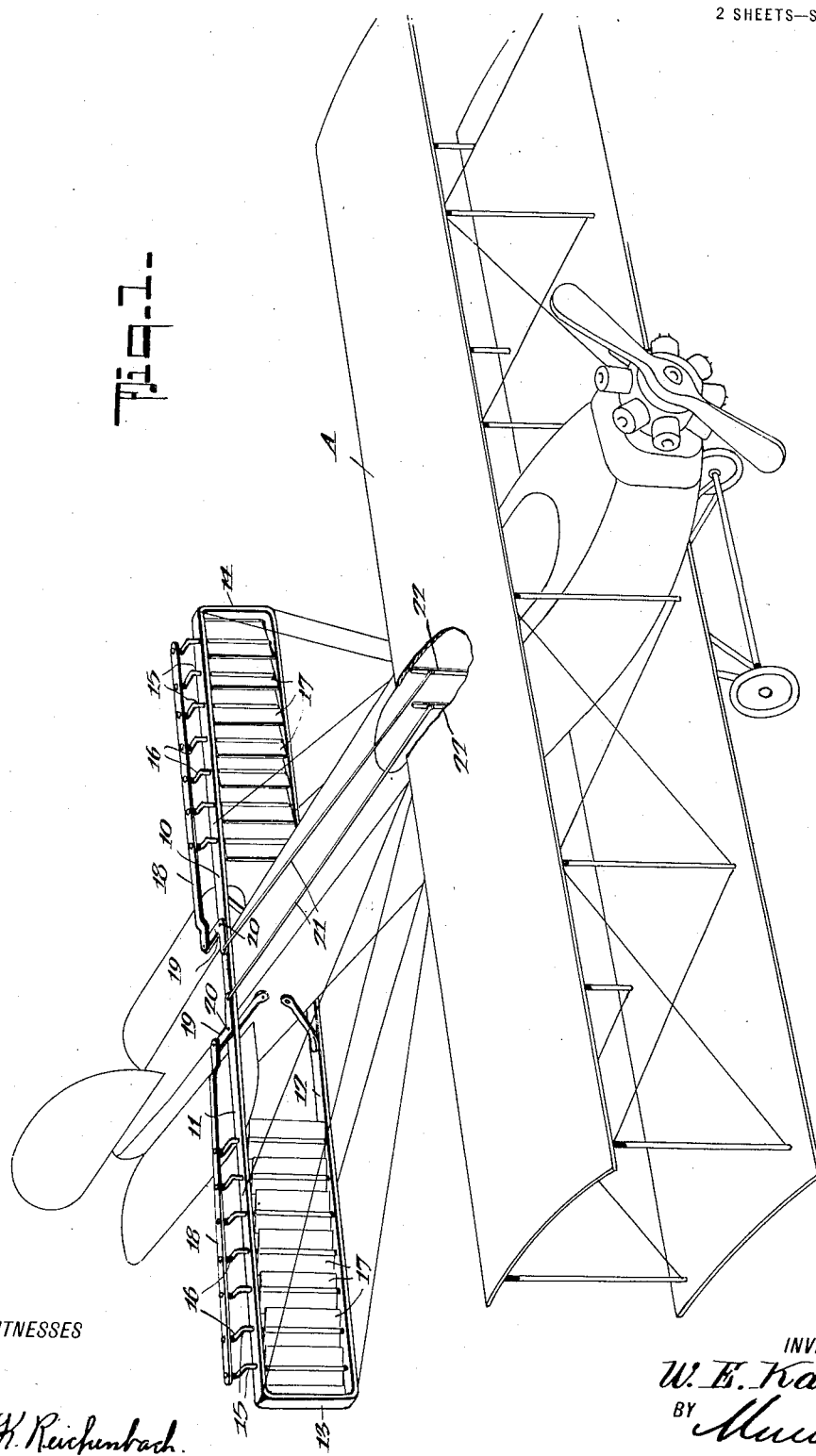

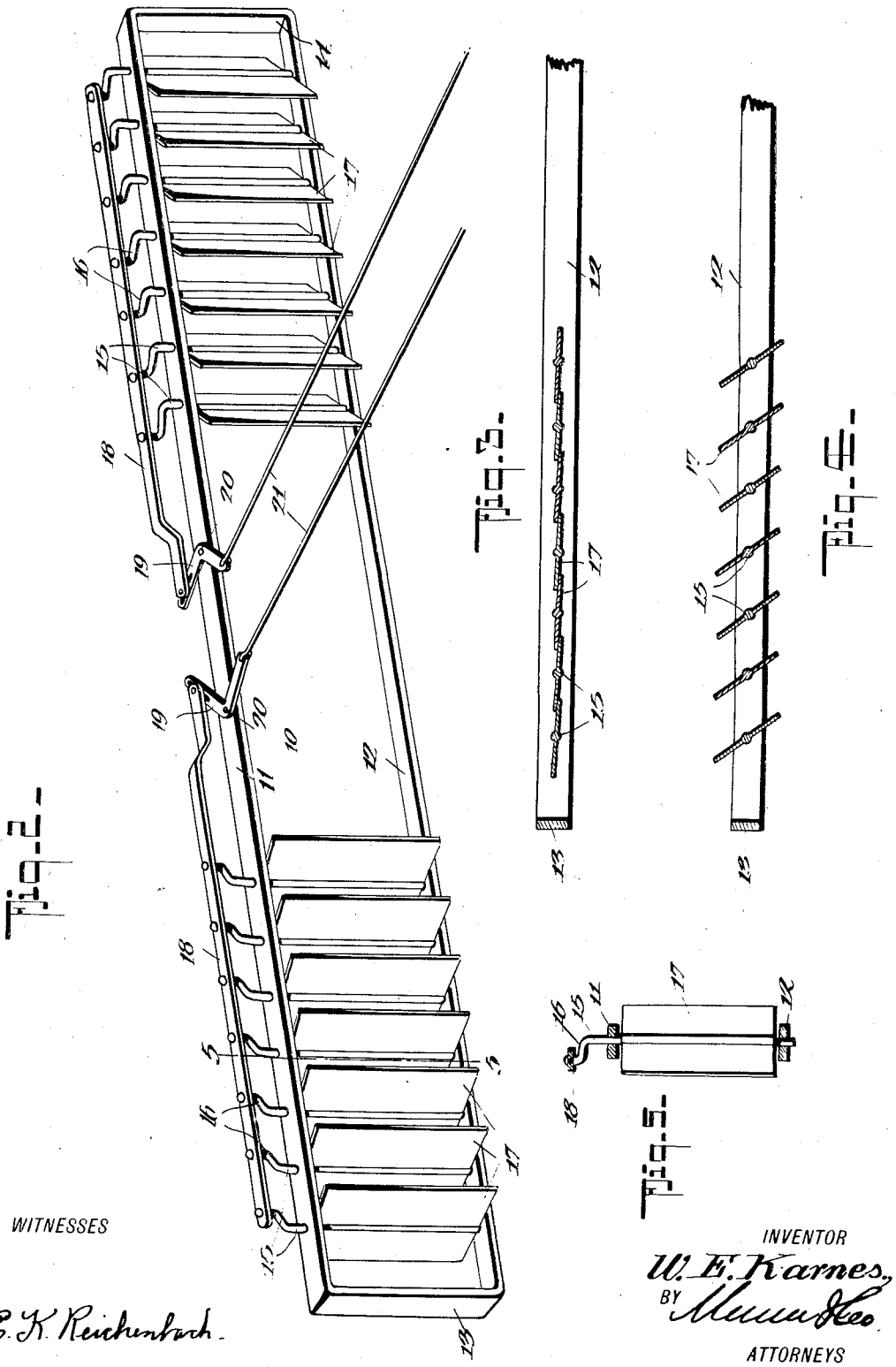

WILLIAM EDWARD KARNES, OF ARLINGTON, NEW JERSEY.

BRAKE FOR AEROPLANES.

1,356,289.   Specification of Letters Patent.   Patented Oct. 19, 1920.

Application filed October 23, 1919. Serial No. 332,654.

*To all whom it may concern:*

Be it known that I, WILLIAM EDWARD KARNES, a citizen of the United States, and a resident of Arlington, in the county of Hudson and State of New Jersey, have invented certain new and useful Improvements in Brakes for Aeroplanes, of which the following is a specification.

My said invention relates to aeroplanes and more particularly to a means for retarding the travel of the machine.

The main object of the invention is to quickly reduce the speed of an aeroplane in order to avoid collision while in the air, or to bring the machine to a stop after having traveled only a very short distance along the ground. I accomplish this result in a very simple manner by means of a device which is easily operated by the aviator and which is at all times under his control.

My invention is fully described in the following specification and particularly pointed out in the appended claims, reference being had to the accompanying drawings forming a part thereof, in which like characters of reference designate similar parts in the several views.

Figure 1 is a perspective view of an aeroplane provided with my invention.

Fig. 2 is a detail perspective view of my invention detached from the aeroplane.

Fig. 3 is a horizontal sectional view taken through one portion of the device, showing the gates closed.

Fig. 4 is a similar view with the gates partly open.

Fig. 5 is a detail cross-section on the line 5—5 of Fig. 2.

In the drawings the letter A represents an aeroplane which I have shown in the form of a bi-plane, but which may be of any type of heavier-than-air machine. Secured to the tail portion of the fuselage is a frame 10 comprising horizontal beams 11 and 12 connected at their ends by means of short vertical beams 13 and 14, thereby forming a long, narrow rectangular structure. Pivoted adjacent to the ends of the frame 10 and in the beams 11 and 12 are a series of vertical shafts 15 provided at their upper ends with cranks 16. Fixed on each of these vertical shafts 15 are gates or blades 17 which are designed to slightly overlap when in their closed position, thereby entirely closing their respective portions of frame 10. Each series of shafts with their respective crank-arms are connected together by means of a connecting rod 18 which runs toward the center of the frame 10 and is there connected to a bell-crank lever 19 by means of a pin and slot connection. This bell-crank lever 19 is pivoted as at 20 to the upper beam 11. The free end of the bell-crank lever just mentioned is connected to a rod 21 which runs forward to the cock-pit where it is connected to an operating lever 22 mounted within easy reach of the aviator.

It will be readily seen that when the aeroplane is in flight and the blades or gates are in their open position, the speed of the aeroplane is not in any way retarded; but, should the aviator see that he is in danger of colliding or for any reason find it necessary to slow up the machine, he need only operate the controlling levers 22 to close the blades or gates 17 which will offer sufficient resistance to the air to cause the machine to appreciably slow up. Also, when the aviator desires to land in a field in which there is not sufficient distance for the machine to come to an ordinary stop, he can close the blades or gates as before stated, which will offer enough resistance to cause the machine to come to a stand-still after having traveled only a very short distance.

Having thus described my said invention, what I claim as new and desire to secure by Letters Patent is:

1. A device for retarding the speed of an aeroplane, comprising an open frame straddling and connected to the trailing end thereof and vertically pivoted means for closing the space within said frame, substantially as set forth.

2. A device of the class described, comprising an open rectangular frame straddling and secured at its central portion on the trailing end of the body of an aeroplane, a series of vertically disposed spaced crank shafts mounted within said frame, transversely of the body of the aeroplane, blades secured to each of said crank-shafts within said frame, the vertical ends of said blades adapted to overlap, and means to revolve said crank-shafts, substantially as set forth.

3. A device of the class described comprising an open frame straddling and mounted on the fuselage of an aeroplane and projecting transversely at right angles thereto, a series of overlapping blades pivotally mounted within said frame each on an independent crank-shaft, a connecting rod connected to the crank arms of each series of crank-shafts, and a bell-crank lever connected to each of said connecting rods and operating levers connected to the opposite arm of each last mentioned bell-crank lever. substantially as set forth.

WILLIAM EDWARD KARNES.

Witness:
MONTAGUE A. CLARK.